United States Patent
Akoum et al.

(10) Patent No.: US 10,568,146 B2
(45) Date of Patent: *Feb. 18, 2020

(54) FACILITATING SIGNALING AND TRANSMISSION PROTOCOLS FOR ENHANCED BEAM MANAGEMENT FOR INITIAL ACCESS

(71) Applicant: AT&T Intellectual Property I, L.P., Atlanta, GA (US)

(72) Inventors: Salam Akoum, Austin, TX (US); Thomas Novlan, Austin, TX (US); Xiaoyi Wang, Austin, TX (US); Arunabha Ghosh, Austin, TX (US); Ralf Bendlin, Cedar Park, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,276

(22) Filed: Apr. 22, 2019

(65) Prior Publication Data

US 2019/0254079 A1  Aug. 15, 2019

Related U.S. Application Data

(63) Continuation of application No. 15/925,822, filed on Mar. 20, 2018, which is a continuation of application
(Continued)

(51) Int. Cl.
*H04W 72/08* (2009.01)
*H04W 74/08* (2009.01)
(Continued)

(52) U.S. Cl.
CPC ...... *H04W 74/0833* (2013.01); *H04B 7/0408* (2013.01); *H04B 7/0695* (2013.01); *H04W 74/006* (2013.01)

(58) Field of Classification Search
CPC .. H04B 7/0814; H04B 7/0639; H04B 7/0404; H04B 7/0634; H03W 40/428; H01Q 1/245; H04W 16/28
(Continued)

(56) References Cited

U.S. PATENT DOCUMENTS 8,547,927 B2  10/2013  Seo et al.
9,203,502 B2  12/2015  Seo et al.
(Continued)

FOREIGN PATENT DOCUMENTS

WO  2016/153176 A1  9/2016

OTHER PUBLICATIONS

Notice of Allowance received for U.S. Appl. No. 15/587,223 dated Dec. 13, 2017, 24 pages.
(Continued)

*Primary Examiner* — Phuoc H Doan
(74) *Attorney, Agent, or Firm* — Amin, Turocy & Watson, LLP

(57) ABSTRACT

Enhanced beam management for a wireless communication system is provided. In one example, a method comprises: receiving, from a mobile device, a message indicating first beam information for a selected first beam of beams associated with the base station device, wherein the message is a first received message of a random access channel procedure; and receiving, from the mobile device, message indicating second beam information for a selected second beam of the beams associated with the base station device, wherein the selected second beam is an alternative to the selected first beam for transmission of downlink data to the mobile device from the base station device, and wherein the second beam is indicated in the first message of a two-step random access channel procedure. Methods of signaling the second beam and/or transmission diversity approaches employing the first beam and/or the second beam are described.

20 Claims, 10 Drawing Sheets

Related U.S. Application Data

No. 15/587,223, filed on May 4, 2017, now Pat. No. 9,949,298.

(51) Int. Cl.
*H04B 7/0408* (2017.01)
*H04W 74/00* (2009.01)
*H04B 7/06* (2006.01)

(58) Field of Classification Search
USPC ............... 370/336, 326, 329; 455/452.1
See application file for complete search history.

(56) References Cited

U.S. PATENT DOCUMENTS

| | | |
|---|---|---|
| 9,204,411 B2 | 12/2015 | Chen et al. |
| 9,451,639 B2 | 9/2016 | Li et al. |
| 9,537,548 B2 | 1/2017 | Thomas et al. |
| 9,549,417 B2 | 1/2017 | Olsson et al. |
| 9,603,165 B2 | 3/2017 | Furuskog et al. |
| 9,648,513 B2 | 5/2017 | Diachina et al. |
| 2005/0215261 A1 | 9/2005 | Cha et al. |
| 2011/0243075 A1 | 10/2011 | Luo et al. |
| 2013/0083774 A1 | 4/2013 | Son et al. |
| 2014/0010178 A1 | 1/2014 | Yu et al. |
| 2014/0044074 A1 | 2/2014 | Chen et al. |
| 2014/0376466 A1 | 12/2014 | Jeong et al. |
| 2015/0063203 A1 | 3/2015 | Kim et al. |
| 2015/0208443 A1 | 7/2015 | Jung et al. |
| 2015/0334746 A1 | 11/2015 | Sun et al. |
| 2016/0043781 A1 | 2/2016 | Cho et al. |
| 2016/0119958 A1 | 4/2016 | Tan et al. |
| 2016/0157267 A1 | 6/2016 | Frenne et al. |
| 2016/0183234 A1 | 6/2016 | Sung et al. |
| 2016/0198474 A1 | 7/2016 | Raghavan et al. |
| 2016/0249386 A1 | 8/2016 | Lyu et al. |
| 2016/0301503 A1 | 10/2016 | Rico Alvarino et al. |
| 2017/0006593 A1 | 1/2017 | Liu |
| 2017/0026962 A1 | 1/2017 | Liu et al. |
| 2017/0033854 A1 | 2/2017 | Yoo |
| 2017/0048775 A1 | 2/2017 | Kim |
| 2017/0141833 A1 | 5/2017 | Kim et al. |
| 2017/0302355 A1 | 10/2017 | Islam et al. |
| 2017/0325057 A1 | 11/2017 | Zhang et al. |
| 2017/0332407 A1 | 11/2017 | Islam et al. |
| 2017/0346545 A1 | 11/2017 | Islam et al. |
| 2018/0070380 A1 | 3/2018 | Nagaraja et al. |
| 2018/0092156 A1 | 3/2018 | Kim et al. |
| 2018/0124724 A1 | 5/2018 | Tsai et al. |
| 2018/0317263 A1* | 11/2018 | Ishii .................. H04W 74/0833 |

OTHER PUBLICATIONS

Non-Final Office Action received for U.S. Appl. No. 15/469,193 dated May 31, 2018, 30 pages.
Non-Final Office Action received for U.S. Appl. No. 15/925,822 dated Jul. 24, 2018, 20 pages.
Notice of Allowance received for U.S. Appl. No. 15/469,193 dated Nov. 19, 2018, 38 pages.
Non-Final Office Action dated Oct. 16, 2019 for U.S. Appl. No. 16/277,293, 25 pages.

* cited by examiner

4-STEP RACH PROCEDURE

2-STEP RACH PROCEDURE

FACILITATING SIGNALING AND TRANSMISSION PROTOCOLS FOR ENHANCED BEAM MANAGEMENT FOR INITIAL ACCESS

RELATED APPLICATION

The subject patent application is a continuation of, and claims priority to each of, U.S. patent application Ser. No. 15/925,822 (now U.S. Pat. No. 10,314,082), filed Mar. 20, 2018, and entitled "FACILITATING SIGNALING AND TRANSMISSION PROTOCOLS FOR ENHANCED BEAM MANAGEMENT FOR INITIAL ACCESS," which is a continuation of U.S. patent application Ser. No. 15/587,223 (now U.S. Pat. No. 9,949,298), filed May 4, 2017, and entitled "FACILITATING SIGNALING AND TRANSMISSION PROTOCOLS FOR ENHANCED BEAM MANAGEMENT FOR INITIAL ACCESS," the entireties of which applications are hereby incorporated by reference herein.

TECHNICAL FIELD

The subject disclosure relates generally to communications systems, and, for example, to systems, methods and/or machine-readable storage media for facilitating signaling and transmission protocols associated with enhanced beam management for initial access in a wireless communication system.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G standards.

DETAILED DESCRIPTION

Figure 1:
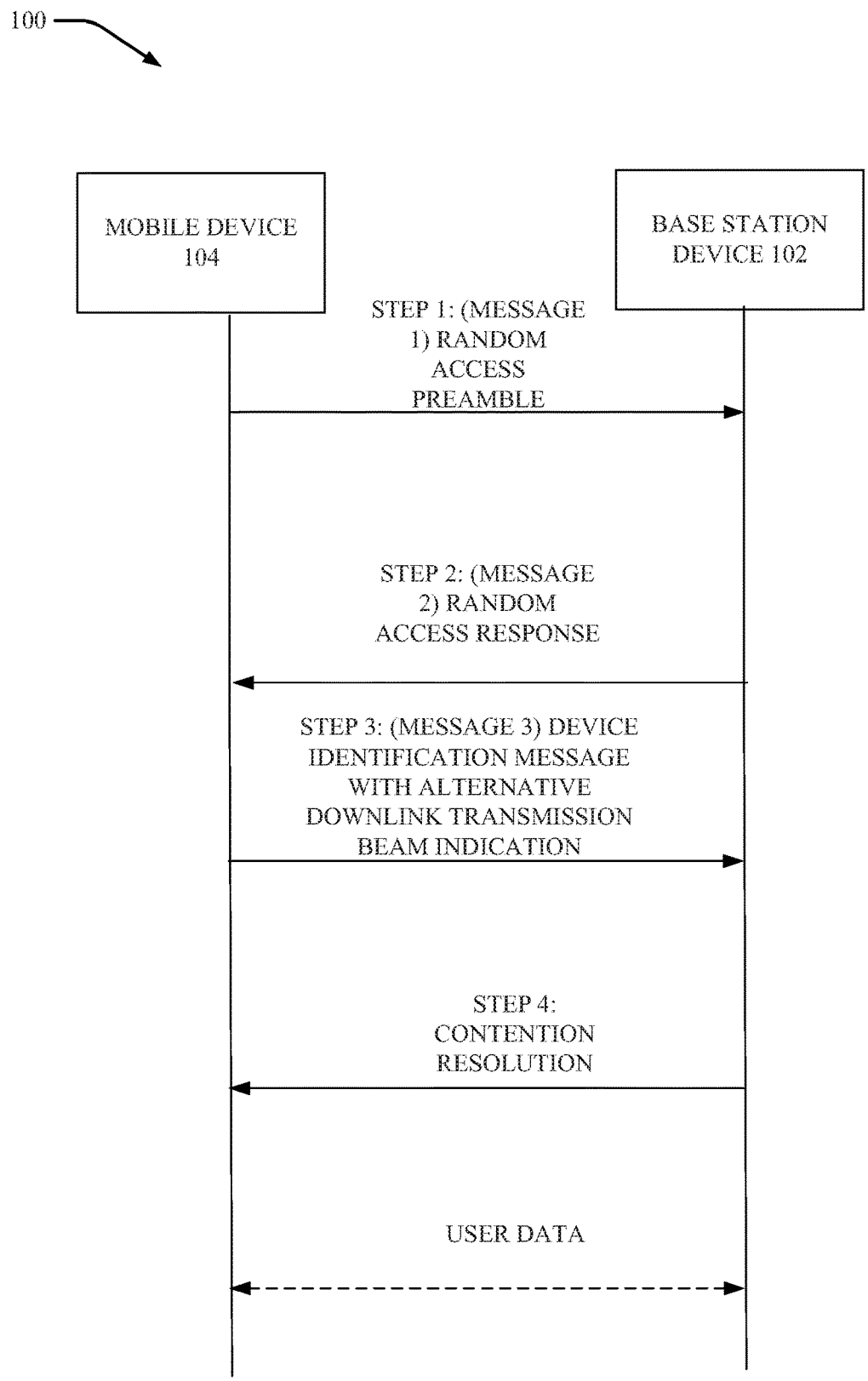
FIG. 1 illustrates an example, non-limiting message sequence flow chart to facilitate a first type of signaling and transmission protocol associated with enhanced beam management for initial access in a wireless communication system in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)," "gNB" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

To meet the huge demand for data centric applications, currently 3GPP is looking towards extending the current 4G standards to 5G. However, there are numerous challenges and/or issues that are expected to arise. As used herein, "5G" can also be referred to as New Radio (NR) access. One or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE. Typically, the following information can be transmitted based on the downlink control information (DCI) format: Localized/Distributed virtual resource block (VRB) assignment flag, resource block assignment, modulation and coding protocol, HARQ process number, new data indicator, redundancy version, transmit power control (TPC) command for uplink control channel, downlink (DL) assignment index, precoding matrix index and/or number of layers.

Systems, methods and/or machine-readable storage media for facilitating signaling and transmission protocols associated with enhanced beam management in a wireless communication system are provided herein. In one embodiment, a method comprises: receiving, by a base station device comprising a processor from a mobile device, a message indicating first beam information for a selected first beam of beams associated with the base station device and indicating second beam information for a selected second beam of the beams associated with the base station device, wherein the selected second beam is an alternative to the selected first beam for transmission of downlink data to the mobile device from the base station device, wherein receiving the message comprises receiving the message as a first message of a multi-step random access channel procedure, wherein the first message comprises a random access preamble and further comprises a device identification message; and in response to the receiving the beam information, facilitating transmitting, by the base station device to the mobile device, a random access channel response as a second message of the two step random access channel procedure.

In another embodiment, a base station device is provided. The base station device comprises: a processor; and a memory that stores executable instructions that, when executed by the processor, facilitate performance of operations, comprising: receiving, from a mobile device, a message indicating first beam information for a selected first beam of beams associated with the base station device, wherein the message is a first received message of a random access channel procedure; and receiving, from the mobile device, a second message indicating second beam information for a selected second beam of the beams associated with the base station device, wherein the selected second beam is an alternative to the selected first beam for transmission of downlink data to the mobile device from the base station device, and wherein the second message is another transmitted message of the random access channel procedure.

In yet another embodiment, a machine-readable storage medium is provided. The machine-readable storage medium can comprise executable instructions that, when executed by a processor of a mobile device, facilitate performance of operations, comprising: facilitating transmitting a message indicating first beam information for a selected first beam of beams associated with a base station device, wherein the message is a message of a random access channel procedure; and facilitating transmitting a second message indicating second beam information for a selected second beam of the beams associated with the base station device, wherein the selected second beam is an alternative to the selected first beam for transmission of downlink data to the mobile device from the base station device, and wherein the second message is another transmitted message of the random access channel procedure.

As will be noted herein, the "second beam information" is not limited to being information associated with a single beam. Rather, in some embodiments, the term "second beam information" and "selected second beam" can mean or include multiple second beams (e.g., multiple alternative beams").

In some embodiments, the mobile device can report alternative DL Tx beams during a 4-step random access channel (RACH) procedure in message 3. These alternative beams can subsequently be used in message 4 of the RACH procedure, in addition to subsequent beam management procedure for connected mode mobile devices. In one or more embodiments, signaling can also be specified to indicate the availability of the one or more alternative DL Tx beams, as well as the transmission protocols that can be used in message 4 and subsequent transmissions to transmit on the identified alternative DL Tx beam in message 3. In some embodiments, a method of indicating one or more alternative DL Tx beams in a 2-step RACH procedure for 5G is also provided.

One or more embodiments can facilitate providing a reliable coarse beam management and/or can be employed for control channel beam management and beam switching. One or more embodiments can provide associated signaling for 4-step RACH procedure and/or 2-step RACH procedure that indicate alternative transmit beams in the PRACH procedure. The signaling can indicate the presence of alternative beam indication in a defined message of the RACH procedure. One or more embodiments can also provide transmission diversity protocols that can be used to make use of the different potential transmit beams for transmission to the mobile device.

One or more embodiments can allow a more reliable beam management procedure through a robust signaling and detection of the alternative beams measured, and/or allow for a more robust beam management procedure by making use of diversity in the downlink transmit beams. In some embodiments, such increased reliability in control channel beam management is not only applicable for enhanced mobile broadband (eMBB) but also for applications requiring high reliability. One or more embodiments can be applicable to help the BS devices and/or network to decide on the downlink transmit beam to use, such that the mobile device has better visibility of the measured beams and can report back to the BS device or network so that the BS device or network can decide on which beam to use for downlink transmission. As used herein, in various embodiments, the term "downlink transmission beam" can be or mean "downlink transmit beam" ("DL Tx beam").

FIG. 1 illustrates an example, non-limiting message sequence flow chart to facilitate a first type of signaling and transmission protocol associated with enhanced beam management for initial access in a wireless communication system (e.g., system 100) in accordance with one or more embodiments described herein. The first type of signaling and transmission protocol can be for a 4-step random access channel (RACH) procedure. In some embodiments, FIG. 1 shows a typical message sequence flow chart for a 4-step random access channel (RACH) procedure in one or more different types of cellular or other wireless networks.

In some embodiments, the system 100 can facilitate indication of a primary or an alternative beam (or, in some embodiments, multiple beams) in random RACH resources for beam management. One or more embodiments of the system 100 described herein can provide signaling and/or transmission protocols to facilitate enhanced initial beam management procedure by indicating one or more alternative DL transmission beams from the BS device 102 to the mobile device 104 during the RACH procedure. In some embodiments, the beam management can be a mobile device 104 assisted beam indication at the mobile device during the RACH procedure.

While the system 100 shows a single BS device 102 and a single mobile device 104, in various embodiments, multiple BS devices and/or multiple mobile devices can be included in system 100. All such embodiments are envisaged.

With reference to FIG. 1, one or more of reference signals and/or pilot signals can be transmitted within the system 100. The reference signals and/or the pilot signals can be beamformed or non-beamformed. In FIG. 1, shown is a typical message sequence chart for random access procedure in wireless communication systems. In some embodiments, the wireless communication system can be a 5G system, although such is not required. As used herein, the term "random access" can mean the procedure for the mobile device 104 to request a connection setup from the BS device 102. Random access can be employed for initial access to the BS device 102 by the mobile device 104 in some embodiments. For example, random access can be employed to facilitate the mobile device 104 moving from radio resource control (RRC)_idle state to RRC_connected state. In some embodiments, the random access can be employed to re-establish a connection between the mobile device 104 and one or more BS devices (e.g., BS device 102) after failure of a link (e.g., communication channel between the mobile device 104 and a BS device), for handover of the mobile device 104, etc. Beam management is a procedure used to acquire and maintain a set of transmitter/receiver point (TRP) beams that can be used for DL transmission, which can include, but is not limited to, beam determination, measurement, and/or reporting. For idle mode mobile devices in initial/random access, beam measurement and/or reporting can be performed using Synchronization Signal (SS) blocks. DL measurements by the mobile device 104 can be supported on both single beam and multi-beam based operations. SS-block-RSRP can be used to measure the beam quality per SS block. The selected beam at the mobile device 104, based on the SS-block-RSRP, can be derived at the BS device 102 from the physical RACH (PRACH) preamble/resource for use as a DL Tx beam in message 2. This implicit beam measurement and reporting in the random access procedure can be made more robust by explicitly reporting one or more alternative DL Tx beams during the RACH procedure, in message 3. These alternative beams can subsequently be used in message 4 of the RACH procedure, in addition to subsequent beam management procedure for connected mode mobile devices.

Referring to FIG. 1, as shown, in step 1, the mobile device 104 can transmit a first message to the BS device. The first message can include a random access preamble for the BS device 102 and/or network to estimate the mobile device 104 timing and/or establish uplink synchronization. In the message 2, the BS device 102 and/or network can then transmit a random access response. The random access response can include, but is not limited to, a timing advance command to adjust the mobile device 104 transmit timing. In some embodiments, the BS device 102 and/or network can assign uplink resources for the mobile device 104 to use for the device identification message shown in step 3.

When the mobile device 104 tries to connect to a BS device (e.g., BS device 102) and/or a network in general, there are uplink (UL) beams that are used for reception from the mobile device 104 to the BS device 102 and there are DL beams that are used for transmission to the mobile device from the BS device 102 based on the mobile device 104 and the BS device 102 performing a synchronization procedure. Accordingly, the mobile device 104 can detect a number of DL beams and can select from any number of different DL beams for one or more beams on which to receive DL transmission. In some embodiments, the mobile device 104 can select at least one beam and an alternative beam. The beams selected can be DL beams that have the best signal strength or power received at the mobile device 104 and/or that have a signal strength or power received at the mobile device 104 that at least exceeds or is substantially equal to a defined threshold. This selection of the alternative beams can be indicated in message 3 of the system 100.

For example, in message 3, the mobile device 104 can employ the uplink physical uplink shared channel (PUSCH) to transmit the identity of the mobile device 104, among other information, to the BS device 102 and/or to the network. For example, the identity can be transmitted in a device identity message and/or any resource of the message 3.

As such, in some embodiments, the content of message 3 can depend on the state of the mobile device 104. In some embodiments, the mobile device 104 can measure and/or report one or more alternative beams in message 3 of the RACH procedure and the BS device 102 and/or network can switch between the first beam indicated by the mobile device 104 and the one or more alternative beams indicated by the mobile device 104. In some embodiments, the BS device 102 can select multiple beams indicated by the mobile device 104 (in lieu of switching between the different beams) for concurrent transmission, for example. In particular, in some embodiments, the mobile device 104 measures the received power whenever synchronization signal (SS) blocks (which include the beams) are received by the mobile device 104. The SS blocks are sent periodically by the network and are not sent on demand.

It is to be noted that the selection of the beams by the mobile device 104 is not necessarily done in the RACH procedure. Rather, the reporting from the mobile device 104 to the base station device 102 can be performed during the RACH procedure. With reference to FIG. 1, the reporting of the initial/first beam by the mobile device 104 can be performed during step 1 of the RACH procedure, but implicitly (e.g., the BS device 102 can infer the information about the initial/first beam selected by the mobile device 104 from the resources used to transmit the message 1 of the RACH procedure described and shown in FIG. 1).

By contrast, again with reference to FIG. 1, the reporting of the second beam information by the mobile device 104 can be performed in step 3 of the RACH procedure and is done explicitly in the sense that information about this beam is sent in the payload of the message 3 in step 3 of FIG. 1.

In embodiments in which switching between beams is employed by the BS device 102, control channel beam switching, performed and/or initiated by the BS device 102, can be provided if it is determined that the first beam has unacceptable signal strength and/or received power at the mobile device 104. In some embodiments, the mobile device 104 can detect the received power and/or signal strength and transmit information to the BS device 102 notifying the BS device 102 and/or requesting a change to another (or the alternative) beam. In some embodiments, the BS device 102 can employ other methods to determine the signal strength and/or received power of the beam at the mobile device 104.

Accordingly, in one or more embodiments, the selection by the mobile device 104 can be beam-based as opposed to cell-based. In beam-based approaches there can be greater directionality and corresponding benefits of the same since there can be multiple smaller beams than for the case of the 3-sector cell-based approach, and the mobile device 104 can select a smaller beam within a particular cell sector, for example as there can be multiple beams being transmitted from a single cell sector of a BS device (e.g., BS device 102).

In some embodiments, in message 4, the BS device 102 and/or network can transmit a contention resolution message on the DL physical downlink shared channel (PDSCH) if there is a contention due to multiple mobile devices trying to access the BS device 102 and/or network. As used herein, contention resolution message is a message that can specify which of multiple mobile devices can access a channel at any particular time. For example, in cases in which more than one mobile device is attempting to access the channel, the contention resolution message can specify which mobile device should access the channel first and/or generally transmit information indicating selection of one mobile device for initial access of the channel. After contention resolution, as shown, the user data associated with the mobile device 104 can be transmitted and/or received.

Accordingly, in some embodiments, all four messages can be transmitted on the same DL beam that the mobile device 104 selected. However, in one or more embodiments described herein, the mobile device 104 can transmit to the network or BS device 102, information (e.g., a report) indicating an alternative beam at the mobile device 104. The alternative beam can be a beam that also has a defined signal strength level (e.g., acceptable or good signal strength as received at the mobile device 104). The mobile device 104 can transmit information identifying the one or more alternative beams in the message 3 device identification message.

In one or more embodiments, the (coarse) beam management procedure can be enhanced by indicating/reporting alternative DL transmission beams in the RACH procedure. In particular, the mobile device 104 can measure one or more beams and report, in message 3 resources of the RACH procedure, the alternative beams selected such that the BS device 102 and/or the network can use one or more of the indicated alternative beams for control channel beam switching.

A RACH procedure can be supported for both radio resource control (RRC)-idle (idle) and RRC-connected (connected) mobile devices (e.g., mobile device 104). At least for a mobile device in idle mode, the mobile device (e.g., mobile device 104) can select the subset of RACH preamble indices based on DL signal measurement and association indicated by the system information (SI). In one or more embodiments, at least for mobile devices in idle mode, current initial access beam management solutions for 5G support obtaining the downlink (DL) transmit/transmission (Tx) beam for message 2 based on the detected RACH preamble/resource at the BS device 102, and the association configured by the BS device 102 between the DL channel, and a subset of RACH resources and/or subset of preamble indices. Indicating additional DL Tx beams in message 3 of the 4-step RACH procedure described with reference to FIG. 1 can increase the robustness of the initial access beam management as well as (subsequently) improve the beam management framework of the connected mobile devices. In some embodiments, the one or more alternative DL Tx beams can be determined at the mobile device 104 through measurements of the synchronization signal (SS) block Reference Signal Received Power (RSRP) ("SS-block-RSRP"), and indicated in message 3 payload to the BS device 104.

One or more embodiments described herein can detail signaling to indicate and/or successfully decode the alternative beam and/or one or more transmission protocols that can make use of the reported alternative beam. In some embodiments, the signaling can command the mobile device to indicate the additional DL Tx beams in message 3. The transmission protocols can make use of the newly indicated alternative beams in message 4 and subsequent connected mobile device beam transmissions. The signaling and/or transmission protocols can be employed for either the 4-step RACH procedure described above with reference to FIG. 1 or the 2-step RACH procedure that will be described below with reference to FIG. 2.

Figure 2:
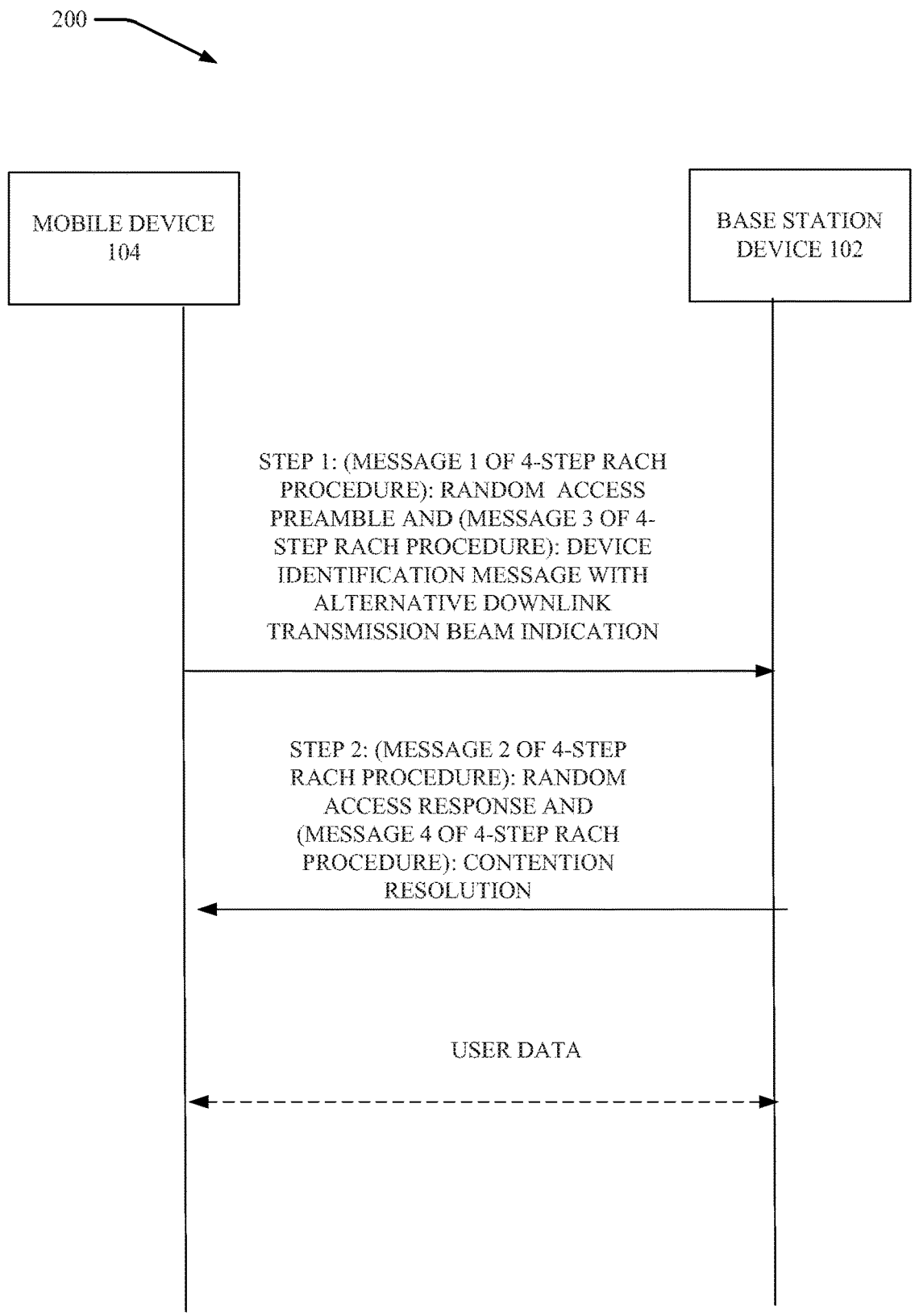
FIG. 2 illustrates an example, non-limiting message sequence flow chart to facilitate a second type of signaling and transmission protocol associated with enhanced beam management for initial access in a wireless communication system in accordance with one or more embodiments described herein.

FIG. 2 illustrates an example, non-limiting message sequence flow chart to facilitate a type of signaling and transmission protocol associated with enhanced beam management for initial access in a wireless communication system in accordance with one or more embodiments described herein. The signaling and transmission protocol can be to facilitate a 2-step RACH procedure. Repetitive description of like elements employed in other embodiments described herein is omitted for sake of brevity.

System 200 can indicate one or more alternative DL TX beams in a 2-step RACH procedure. In addition to the baseline 4-step RACH procedure, a simplified RACH procedure can be defined whereas the four steps are replaced with two steps. The main motivation of the simplified RACH procedure is to reduce the overhead and delay, when a small packet is transmitted. This may also be beneficial in an unlicensed scenario, or an LTE-assisted random access procedure.

In the embodiment for the 2-step RACH indication of one or more alternative DL TX means, the transmission contents are combined into two steps instead of four steps. For example, message 1 in the 2-step RACH procedure can include the contents of messages 1 and 3 of the 4-step RACH procedure, where the preamble can be sent followed by the message part that contains the device identity in addition to other mobile device messages. For the 2-step RACH procedure, the alternative DL Tx beam can be indicated in message 1 by the mobile device 104, along with the original downlink Tx beam indicated through the preamble/resource (as opposed to indicating the alternative DL TX beam in message 3 of the 4-step RACH procedure).

The message 2 in step 2 of the 2-step RACH procedure can include the content of the combination of message 2 and message 4 of the 4-step RACH procedure, where message 2 carries timing advance, UL grant and contention resolution information.

Measuring for the BS device 104 transmit beams that can be used for RACH and subsequent transmissions, can be based on SS-block-RSRP, similar to the 4-step RACH procedure. Measurements can also be based on CSI-RS resources whereas the mobile station device chooses the Tx beams that result in the best CSI-RS-RSRP and reports on those beams to the gNB in message 2 of the 2-step RACH procedure. The resources may be configured for the UE from a set of resources for the purpose of beam selection, mobility, and/or recovery procedures.

For the simplified 2-step RACH procedure, in some embodiments, the signaling for the mobile device 104 to report an alternative downlink transmit beam in message 1 can have a dedicated signaling to the mobile device 104 that is performing the RACH procedure, rather than broadcast system information. Thus, the dedicating signaling mode described below can be applied for the 2-step RACH procedure. The RACH configuration and associated resources can be independent from the configuration and/or resources indicated for the 4-step RACH procedure.

After successfully decoding the indication of the alternative downlink beams, in the 2-step RACH procedure, the BS device 102 and/or network can make use of available transmit beams in various diversity protocols in message 2 of the 2-step RACH procedure, as well as subsequent beam management, as detailed herein.

One or more embodiments of signaling and/or transmission diversity can be as described below with reference to FIGS. 3-9. The signaling can be used to command the mobile device to indicate the alternative DL Tx beam while the transmission protocols can be used to transmit on the identified alternative DL Tx beam in message 3 of the 4-step RACH procedure (or message 1 of the 2-step RACH procedure). Accordingly, to indicate the alternative beam in message 3 of the 4-step RACH procedure (or message 1 of the 2-step RACH procedure), one or more embodiments can describe how to perform signaling to command to the mobile device to indicate one or more alternative beams and how to use the one or more alternative beams in message 4 of the 4-step RACH procedure (or how to use the one or more alternative beams in message 2 of the 2-step RACH procedure). Accordingly, there are two main components for each RACH procedure described herein: signaling for the 4-step or the 2-step RACH procedure; how to use the one or more alternative beams that are indicated by the mobile device 104 to the BS device 102 or network.

Figure 3:
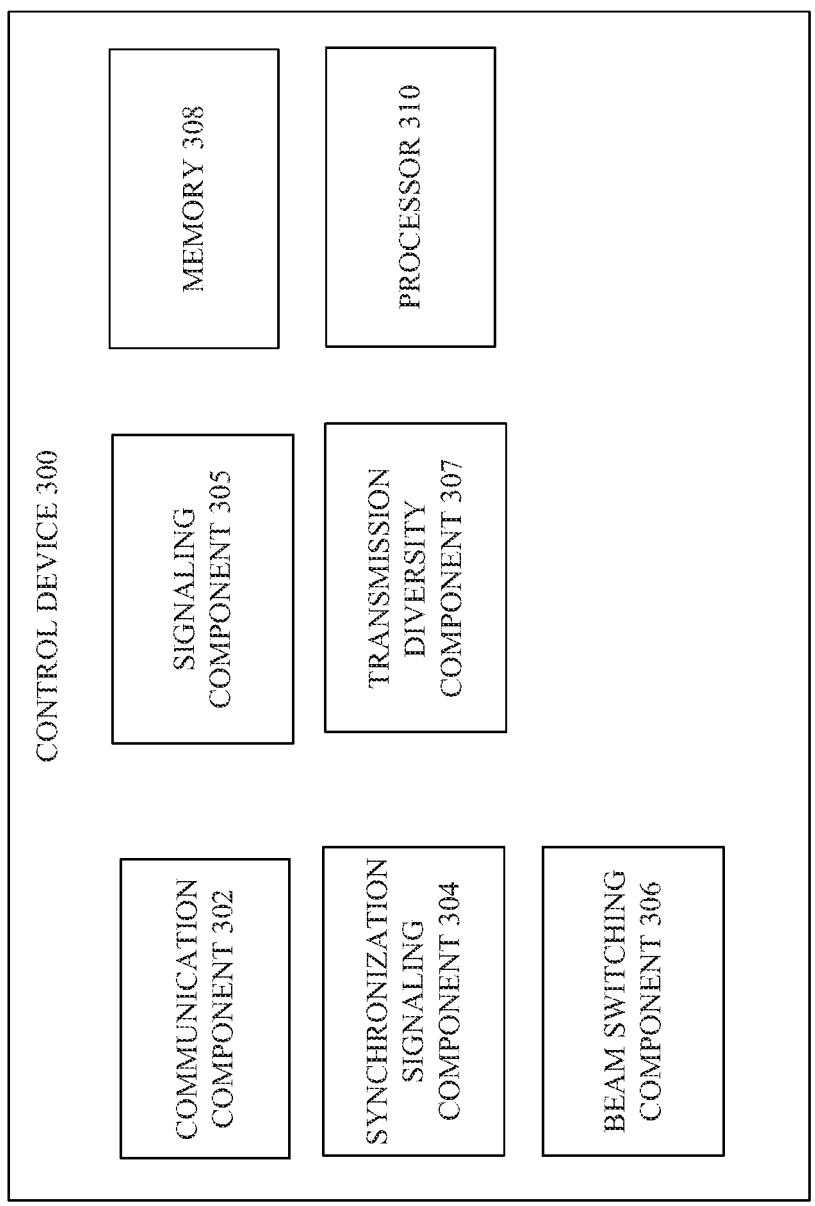
FIG. 3 illustrates an example, non-limiting block diagram of a control device facilitating signaling and transmission protocols associated with enhanced beam management can be facilitated in accordance with one or more embodiments described herein.
Figure 4:
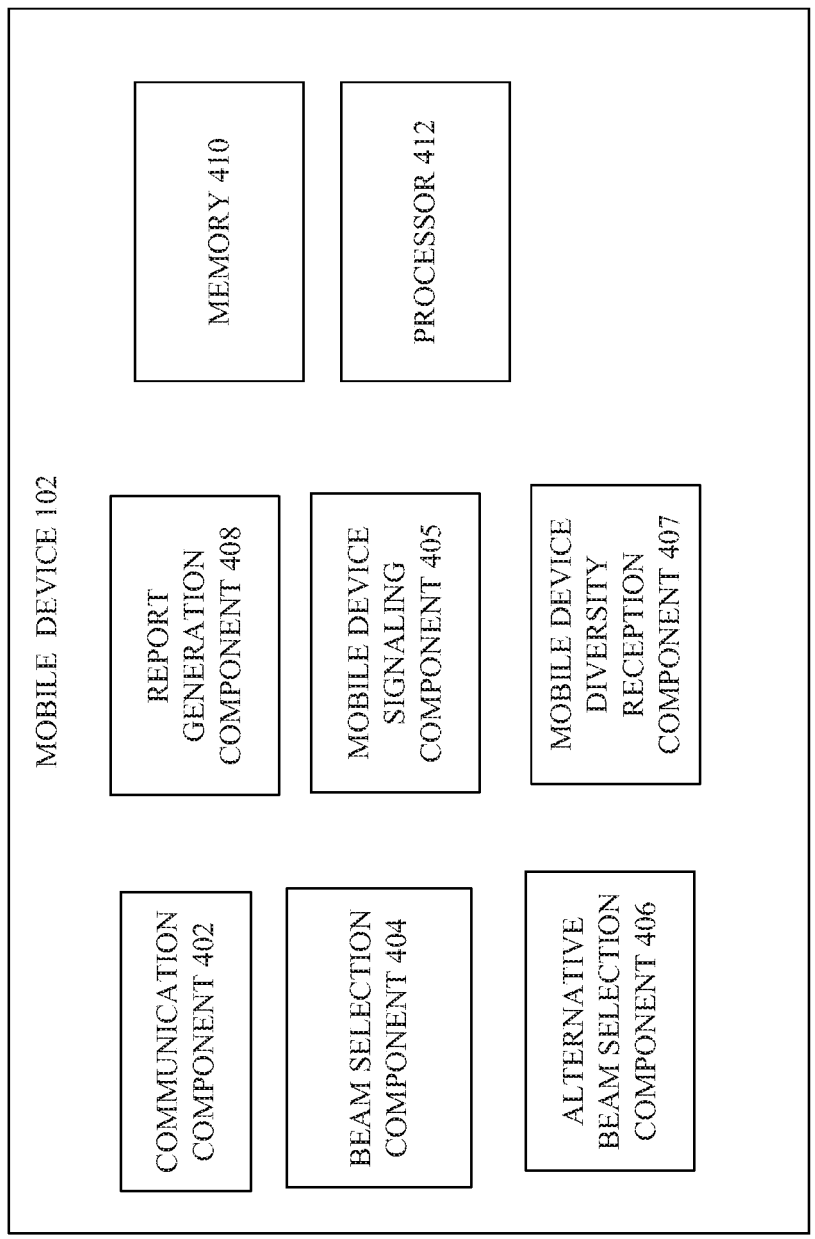
FIG. 4 illustrates an example, non-limiting block diagram of a mobile device for which signaling and transmission protocols associated with enhanced beam management can be facilitated in accordance with one or more embodiments described herein.

Turning first to FIGS. 3 and 4, FIG. 3 illustrates an example, non-limiting block diagram of a control device facilitating signaling and transmission protocols associated with enhanced beam management can be facilitated in accordance with one or more embodiments described herein. FIG. 4 illustrates an example, non-limiting block diagram of a mobile device for which signaling and transmission protocols associated with enhanced beam management can be facilitated in accordance with one or more embodiments described herein. Repetitive description of like elements employed in other embodiments described herein is omitted for sake of brevity.

Control device 300 can be or be included in BS device 102 (or another network device) in some embodiments. Control device 300 can comprise a communication component 302, synchronization signal component 304, beam switching component 306, signaling component 305, transmission diversity component 307, memory 308 and/or processor 310. In one or more embodiments, one or more of communication component 302, synchronization signal component 304, beam switching component 306, signaling component 305, transmission diversity component 307, memory 308 and/or processor 310 can be electrically and/or communicatively coupled to one another to perform one or more functions of the control device 300 (and/or the BS device 102).

Mobile device 102 can comprise communication component 402, beam selection component 404, alternative beam selection component 406, report generation component 408, mobile device signaling component 405, mobile device diversity reception component 407, memory 410 and/or processor 412. In various embodiments, one or more of the comprise communication component 402, beam selection component 404, alternative beam selection component 406, report generation component 408, mobile device signaling component 405, mobile device diversity reception component 407, memory 410 and/or processor 412 can be electrically and/or communicatively coupled to one another to perform one or more functions of mobile device 102.

The communication component 402 of the mobile device 104 can receive one or more messages (messages described with reference to systems 100, 200 and/or 300) from the communication component 302 of one or more BS devices (e.g., BS device 104) and/or network devices. In some embodiments, during the synchronization stage in which the mobile device 104 and BS device 102 are synchronizing, the synchronization signal component 304 of the BS device 102 can generate one or more DL beams and/or synchronization information for transmission to the mobile device 104.

In some embodiments, the communication component 402 can receive and/or transmit one or DL and/or UL beams from and/or to the communication component 302 during random access, synchronization with the BS device 102 or the like.

During synchronization between the mobile device 104 and the BS device 102, the mobile device 104 beam selection component 404 and/or the alternative beam selection component 406 can detect and/or receive and/or process one or more DL beams to determine the signal strength and/or the power of the received DL beam. The beam selection component 404 can select a first beam for DL transmission from the BS device 102 to the mobile device. The alternative beam selection component 406 can detect and/or receive and/or process one or more DL beams and select one or more of the received DL beams as an alternative beam to use for DL transmission from the BS device 102. The report generation component 408 of the mobile device 104 can generate a report identifying the first beam to use and/or the alternative beam to use. While the embodiments may use the term "first" relative to "first beam," in some embodiments, the BS device 102 can initially use the alternative beam and switch to the "first" beam if the received signal strength and/or power at the mobile device 104 is not satisfactory (as opposed to the converse of starting with the "first" beam and switching to the alternative beam). All such embodiments are envisaged.

Based on a determination by the BS device 102 and/or receipt of information indicating the signal strength and/or received power of the initial beam employed on the DL from the BS device 102 to the mobile device 104 is not satisfactory (or has a signal strength or received power at the mobile device 104 that is less than a defined acceptable threshold), in some embodiments, the beam switching component 306 of the BS device 102 can switch to the alternative from the first beam (or from the alternative to the "first" beam as indicated above).

The memory 410 can store instructions that can be executed by processor 412 to select one or more DL beams (e.g., initial/first beams and/or alternative beams), provide a report in message 3 of system 100, detect and/or measure the signal strength and/or power of the DL beams or the like. The memory 308 can store instructions that can be executed by processor 510 to receive information for selection of one or more DL beams (e.g., initial/first beams and/or alternative beams), transmit over such selected beams, perform switching to an alternative beam or an initial/first beam from the alternative beam, estimate or process information or notifications regarding the signal strength and/or power of the DL beams or the like.

In some embodiments, to support the transmission of one or more alternative DL Tx beams in message 3 of the 4-step RACH procedure, two options can be available.

The first option is for the BS device 102 and/or network to use the same message 3 content types normally transmitted in the 4-step RACH procedure (or in the message 2 content types normally transmitted in the 2-step RACH procedure), without any associated signaling about the presence of an alternative beam indication by the mobile device 104. The BS device 102 in this embodiment can decode message 3 content of the 4-step RACH procedure (or message 2 content of the 2-step RACH procedure) with no associated signaling from the mobile device 104 and can detect the presence or lack thereof of an alternative DL Tx beam reporting by the mobile device 102.

The second option is to introduce a certain associated signaling from BS device 102 or network to the mobile device 104. For example, the BS device 102 or network can signal to the mobile device 104 to indicate one or more alternative beams. For example, the signaling can be received at mobile device signaling component 405 of mobile device 104 from signaling component 305 of control device 300 and/or BS device 102. Such associated signaling received by the mobile device 104 can indicate to the mobile device 104 whether or not to send information indicating the one or more alternative DL Tx beams in message 3 payload of the 4-step RACH procedure (or message 1 payload of the 2-step RACH procedure). This, in turn, can allow the signaling component 305 of the control device 300 and/or BS device 102 to properly receive, demodulate and/or decode the information identifying the one or more alternative DL Tx beams sent in the message 3 payload of the 4-step RACH procedure (or the message 1 payload of the 2-step RACH procedure).

One way to send signaling from the signaling component 305 of the control device 300 and/or the BS device 102 is to transmit information to the mobile device signaling component 405 of the mobile device 104 commanding the mobile device 104 to send information about one or more alternative beams using system information (SI).

In one or more embodiments, SI can be information that is broadcasted by the control device 300, BS device 102 and/or network and that is received by one or more mobile devices in order for the one or more mobile devices to be able to access and in general operate properly within the network associated with the control device 300 and/or BS device 102 and within the cell. The SI can include, among other things, information about the DL cell bandwidth, UL cell bandwidth, detailed parameters related to random access transmission, and so on.

In some embodiments, SI can be delivered either by Master Information Block (MIB) containing only essential system information, or through System Information Blocks (SIBs), which can include the main part of the system information, and can be transmitted using the downlink shared channel (DLSCH).

There are a number of different SIBs that can be defined, depending on the type of information that is included within the SIBs. Some SI is qualified as minimum system information, and is typically included in the MIB/SIBs (e.g., cell camping parameters, RACH parameters, etc.). Other system information can only be relevant to certain networks or mobile devices, and need not be broadcasted all the time. The scheduling information about the other SIBs is included in the minimum SI. First SIB indicates for example the time frequency resources and scheduling information about the remaining SIBs. In some embodiments, the SIB already signals the RACH procedure information and can therefore be employed to also indicate one or more alternative beams. Another approach is dedicated signaling to the mobile device 104.

For the purposes of signaling the presence or the lack thereof of the alternative DL Tx beam indication in message 3 of the 4-step RACH procedure (or message 1 of the 2-step RACH procedure), SI can be included in the SIB s and received by the mobile device 104. This SI can be, for example, included in the same SIB that contains information about random access parameters. The signaling about message 3 of the 4-step RACH procedure (or message 1 of the 2-step RACH procedure), transmitted in SI, in a given SIB, can indicate the format of message 3 sequence of the 4-step RACH procedure (or message 1 of the 2-step RACH procedure), and whether the mobile device 104 should report on an alternative DL Tx beam (s) in the message 3 payload of the 4-step RACH procedure (or in the message 1 payload of the 2-step RACH procedure).

If the network is deployed as non-standalone using dual connectivity (e.g., if a 5G system is employed as non-standalone using dual connectivity between LTE and 5G, where LTE acts as the master node), the RACH configuration can be provided by broadcast or dedicated (e.g. RRC) signaling to the mobile device 104, including the indication of whether alternative DL Tx beam(s) reporting is supported in message 3 of the 4-step RACH procedure (or message 1 of the 2-step RACH procedure).

In addition, it is noted that the reporting of the one or more alternative DL Tx beams can be from the set of all detected SS-Blocks by the mobile device 104 or can be from a subset of SS-Blocks if such an association between DL and UL resources is provided in the RACH configuration indicated by broadcast or higher layer signaling.

In one or more embodiments, transmission diversity using the one or more alternative DL Tx beams can be employed by the transmission diversity component 307 of the BS device 102, control device 300 and/or network and the mobile device diversity reception component 407 of the mobile device 102.

When the one or more alternative DL Tx beams are indicated in message 3 of the 4-step RACH procedure (or message 1 of the 2-step RACH procedure), and successfully received at the BS device 102, control device 300 and/or the network, the BS device 102 and/or control device 300 can make use of the additional (e.g., the beam indicated as an alternative) DL Tx beam for DL transmission to the mobile device 104 in message 4 of the 4-step RACH procedure (or message 2 of the 2-step RACH procedure), as well as subsequent connected mode DL transmissions.

There are a number of embodiments by which the BS device 102, control device 300 and/or network can make use of the one or more alternative DL Tx beams. In one embodiment, when message 3 of the 4-step RACH procedure (or message 1 of the 2-step RACH procedure) is successfully decoded, the BS device 102 and/or control device 300 has access to at least two beams to use for DL transmission (the primary (e.g., original or initial) beam indicated by the mobile device 104 as well as at least one alternative beam indicated by the mobile device 104). The BS device 102 and/or control device 300 can hence implement diversity protocols using the multitude of beams.

In one embodiment, the diversity protocol can include the transmission diversity component 407 of the BS device 102 or the control device 300 transmitting using an alternative DL Tx beam, in lieu of the original DL Tx beam used for transmission in message 2 of the 4-step RACH procedure (the original DL Tx beam used for transmission in message 2 of the 2-step RACH procedure).

In one embodiment, the diversity protocol can include the transmission diversity component 407 of the BS device 102 or the control device 300 keeping the transmission on the original DL Tx beam used for message 2 in the 4-step RACH procedure (or keeping the transmission on the original DL Tx beam used for message 2 of the 2-step RACH procedure). The mobile device diversity reception component 407 can determine whether diversity is employed and/or determine how to configure the mobile device for appropriate reception of the beam transmitted.

In one embodiment, the diversity protocol can include the transmission diversity component 407 of the BS device 102 or the control device 300 transmitting using both the original and an alternative DL Tx beam, such that the same transmission is carried on two or more downlink Tx beams. The mobile device diversity reception component 407 can determine whether diversity is employed and/or determine how to configure the mobile device for appropriate reception of the original and alternative beams transmitted.

In one embodiment, the diversity protocol can include the transmission diversity component 407 of the BS device 102 or the control device 300 combining two or more identified DL Tx beams into one wider beam, and using the wider beam for DL transmission. The mobile device diversity reception component 407 can determine whether diversity is employed and/or determine how to configure the mobile device for appropriate reception of the wider beam transmitted.

This increased diversity helps improve the robustness in the random access procedure as well as subsequent DL transmissions whereas BS device 102 uses the DL Tx beams identified during the initial access procedure to carry out control information, for example, for connected mobile devices.

FIGS. 5, 6, 7, 8 and 9 illustrate flowcharts of methods facilitating signaling and transmission protocols associated with enhanced beam management in accordance with one or more embodiments described herein. Repetitive description of like elements employed in other embodiments described herein is omitted for sake of brevity.

Figure 5:
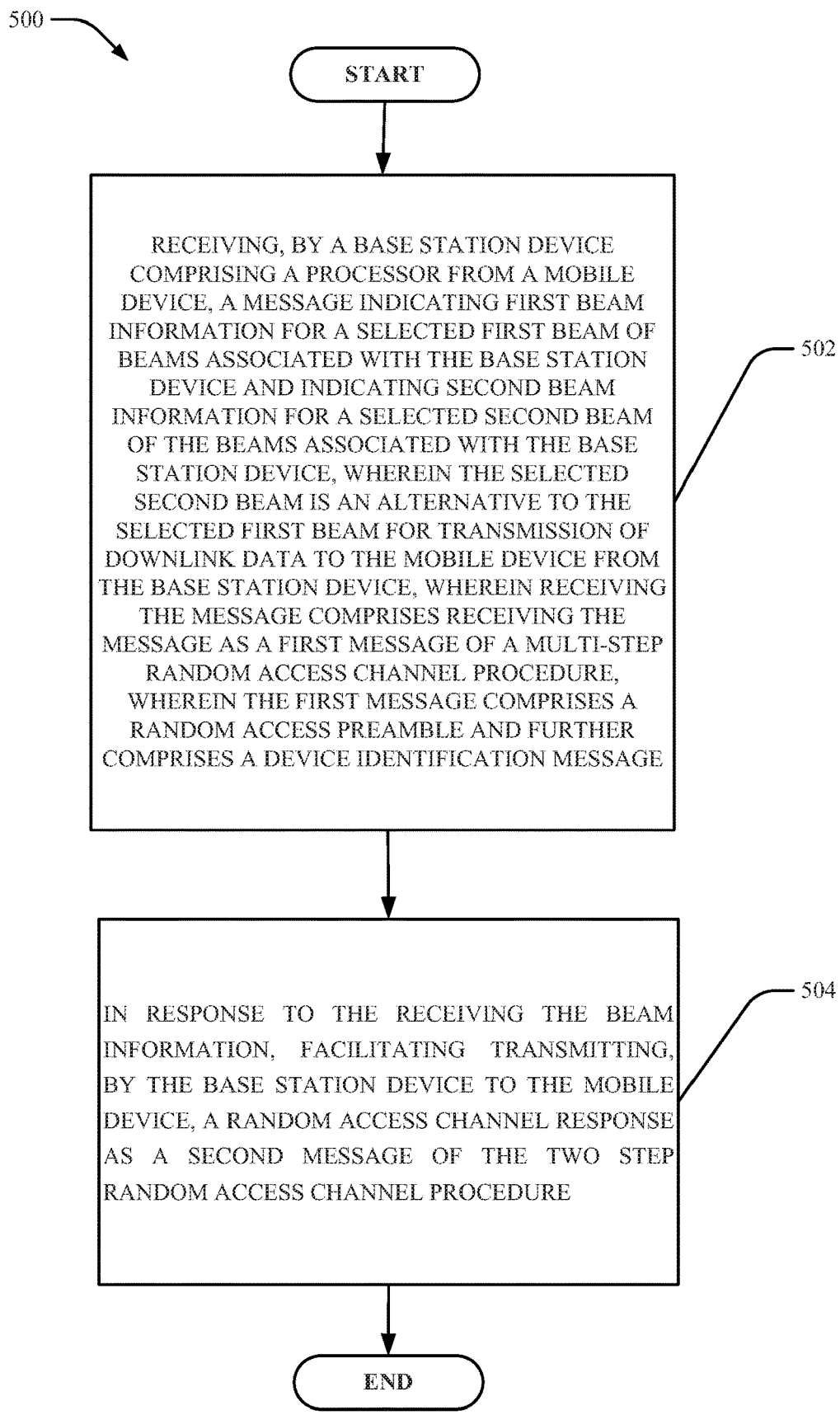
FIGS. 5, 6, 7, 8 and 9 illustrate flowcharts of methods facilitating signaling and transmission protocols associated with enhanced beam management in accordance with one or more embodiments described herein.

Turning first to FIG. 5, at 502, method 500 can comprise receiving, by a base station device comprising a processor from a mobile device, a message indicating first beam information for a selected first beam of beams associated with the base station device and indicating second beam information for a selected second beam of the beams associated with the base station device, wherein the selected second beam is an alternative to the selected first beam for transmission of downlink data to the mobile device from the base station device, wherein receiving the message comprises receiving the message as a first message of a multi-step random access channel procedure, wherein the first message comprises a random access preamble and further comprises a device identification message. In some embodiments, the multi-step random access channel procedure is a two-step random access channel procedure.

At 504, method 500 can comprise in response to the receiving the beam information, facilitating transmitting, by the base station device to the mobile device, a random access channel response as a second message of the two step random access channel procedure.

Figure 6:
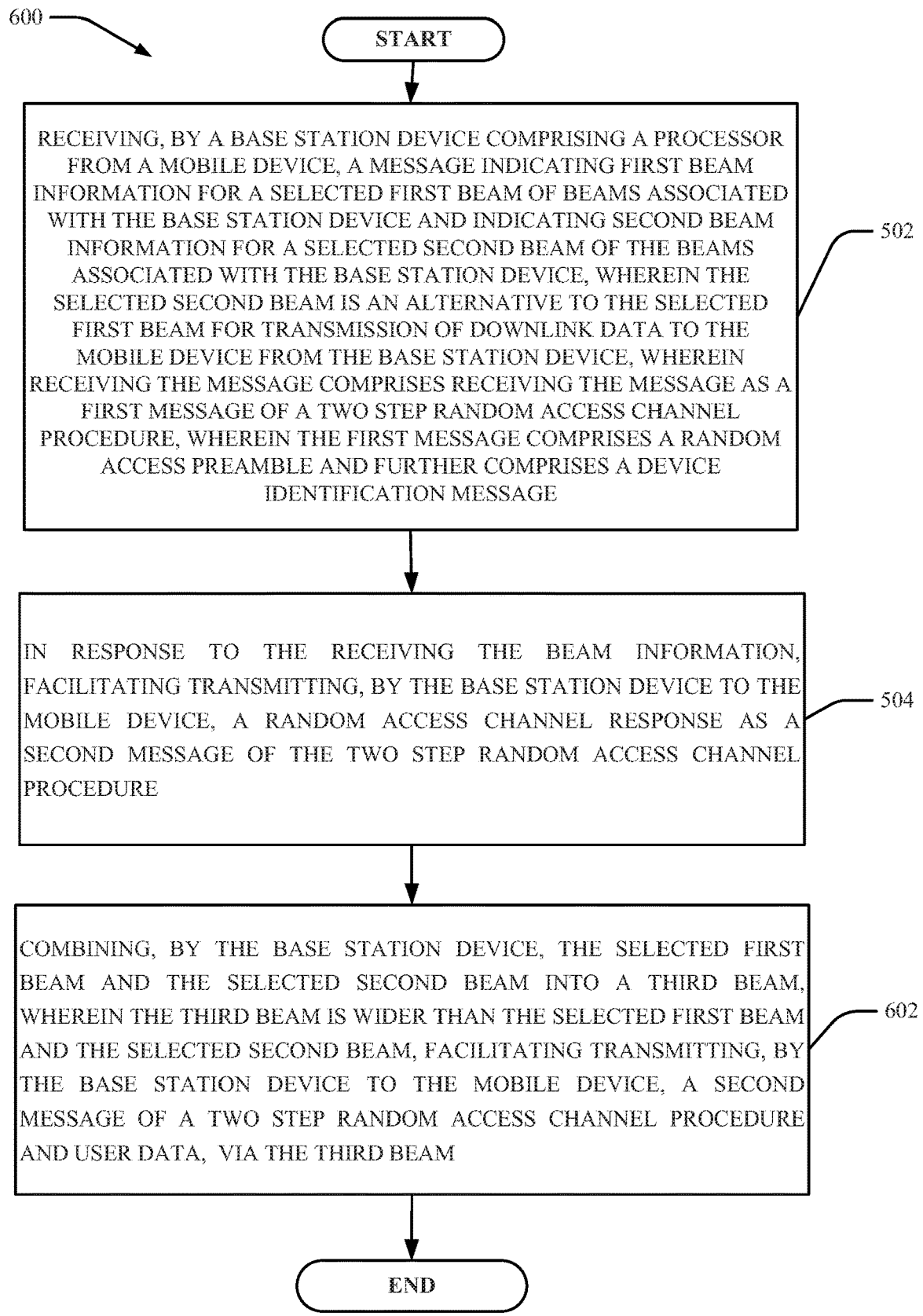

Turning to FIG. 6, method 600 can comprise 502 and 504 of method 500. At 602, method 600 can also comprise combining, by the base station device, the selected first beam and the selected second beam into a third beam, wherein the third beam is wider than the selected first beam and the selected second beam, facilitating transmitting, by the base station device to the mobile device, a second message of a two step random access channel procedure and user data, via the third beam. In some embodiments, the facilitating transmitting can be facilitating transmitting, by the base station device to the mobile device, message 4 of the 4-step RACH procedure (message 2 of the 2-step RACH procedure) and subsequent user data/control, via the third beam.

Figure 7:
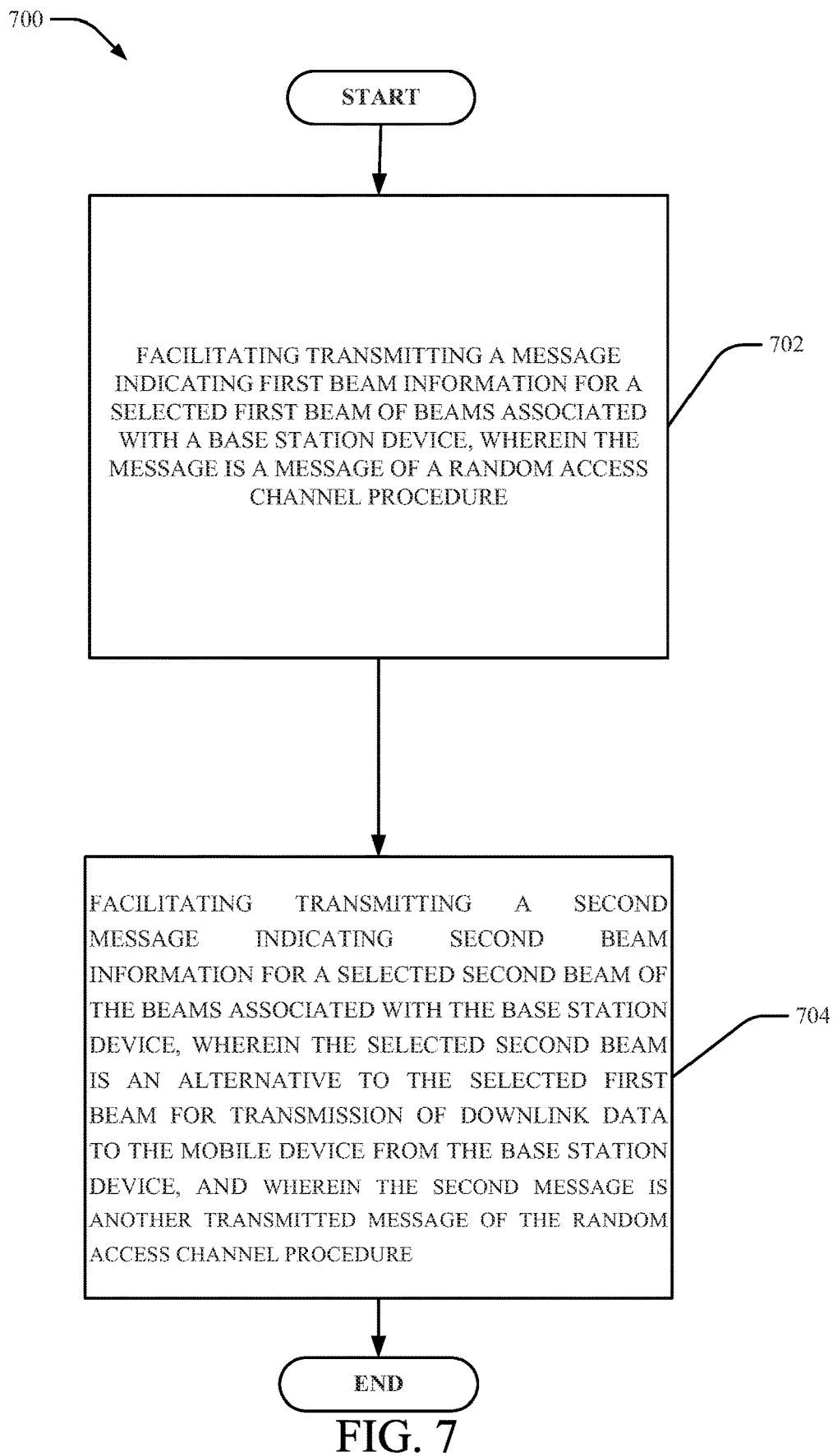

Turning now to FIG. 7, at 702, method 700 can comprise facilitating transmitting a message indicating first beam information for a selected first beam of beams associated with a base station device, wherein the message is a message of a random access channel procedure. At 704, method 700 can comprise facilitating transmitting a second message indicating second beam information for a selected second beam of the beams associated with the base station device, wherein the selected second beam is an alternative to the selected first beam for transmission of downlink data to the mobile device from the base station device, and wherein the second message is another transmitted message of the random access channel procedure.

In some embodiments, although not shown, the method 700 can comprise, prior to the prior to the facilitating transmitting the message indicating the first beam information and the second beam information, receiving signaling from the base station device comprising a command to the mobile device to transmit to the base station device information about an alternative beam, and wherein the signaling is received employing system information comprising a random access channel parameter.

In some embodiments, the system information is included in a system information block comprising random access parameter information and transmitted from the base station device using the downlink shared channel. In some embodiments, the system information indicates a format of the message of the random access channel procedure and whether the mobile device is to be instructed to transmit an identifier for the alternative beam.

In various embodiments, the method 900 can include, but is not limited to: receiving, from the base station device, data comprising at least one of: receiving the data via the selected second beam instead of the selected first beam, receiving the data such that a same content of the data is transmitted on the selected first beam and the selected second beam, or receiving the data on a third beam, wherein the third beam is a combination of the selected first beam and the selected second beam and is wider than the selected first beam and the selected second beam.

In some embodiments, the method can comprise employing the selected second beam instead of the selected first beam, facilitating transmitting, by the base station device to the mobile device, message 4 of the 4-step RACH procedure (message 2 of the 2-step RACH procedure) and subsequent user control/data; wherein the facilitating the transmitting of the message 4 (message 2 and/or user data comprises facilitating the transmitting of a same content of the user on both the selected first beam and the selected second beam; and/or combining, by the base station device, the selected first beam and the selected second beam into a third beam, wherein the third beam is wider than the selected first beam and the selected second beam, and facilitating transmitting, by the base station device to the mobile device, message 4 (message 2 and/or user data/control, via the third beam.

In some embodiments, the signaling is transmitted as a dedicated signal from the base station device to the mobile device in lieu of a broadcast signal from the base station device. In some embodiments, the system information is included in a system information block containing random access parameter information and transmitted using the downlink shared channel. In some embodiments, the system information indicates a format of the third message of the 4-step RACH procedure or first message of the two-step random access channel procedure and whether the mobile device should report the one or more alternative beams.

Figure 8:
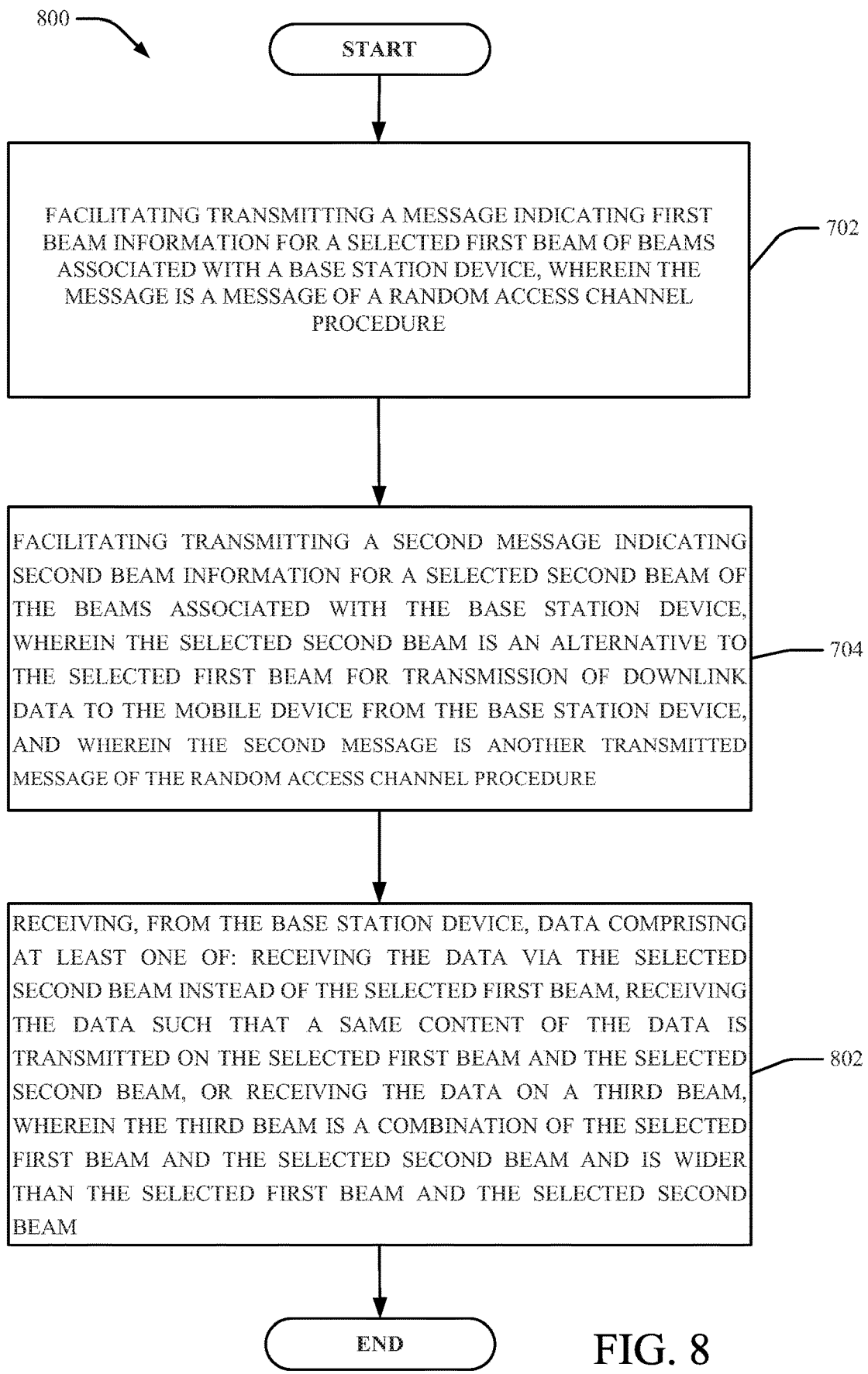

Turning now to FIG. 8, method 800 can comprise 702 and 704 of method 700. Further, method 800 can comprise, at 802, receiving, from the base station device, data comprising at least one of: receiving the data via the selected second beam instead of the selected first beam, receiving the data such that a same content of the data is transmitted on the selected first beam and the selected second beam, or receiving the data on a third beam, wherein the third beam is a combination of the selected first beam and the selected second beam and is wider than the selected first beam and the selected second beam.

Figure 9:
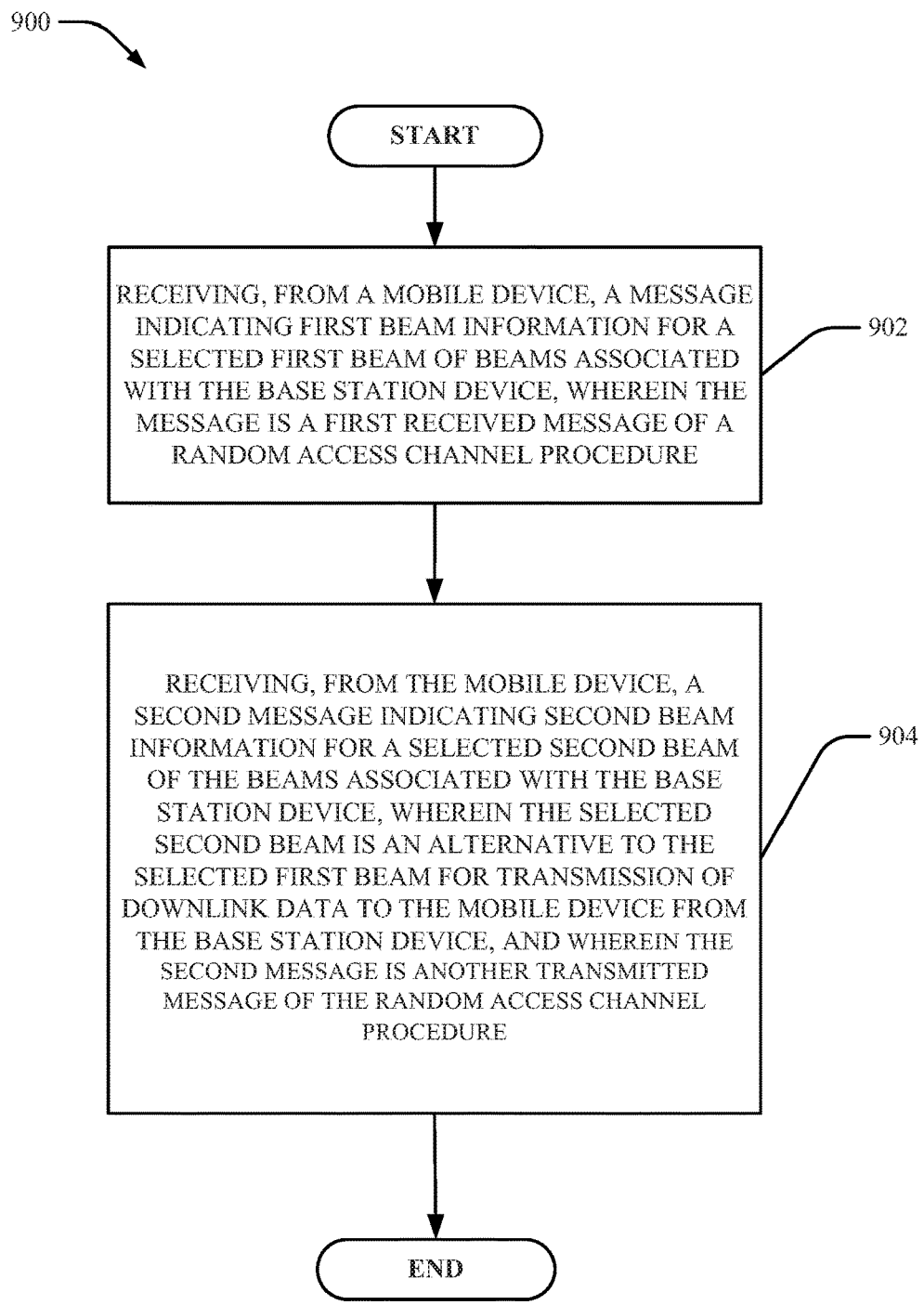

Turning now to FIG. 9, at 902, method 900 can comprise receiving, from a mobile device, a message indicating first beam information for a selected first beam of beams associated with the base station device, wherein the message is a first received message of a random access channel procedure.

At 904, method 900 can comprise receiving, from the mobile device, a second message indicating second beam information for a selected second beam of the beams associated with the base station device, wherein the selected second beam is an alternative to the selected first beam for transmission of downlink data to the mobile device from the base station device, and wherein the second message is another transmitted message of the random access channel procedure. In some embodiments, the second beam is in message 3 of the 4-step random access channel procedure, and message 1 (step 1) of the two-step RACH procedure.

In some embodiments, although not shown, method 900 can comprise, prior to the receiving second message indicating the second beam information, transmitting signaling to the mobile device comprising a command to the mobile device to transmit to the base station device information about an alternative beam, wherein the transmitting the signaling is transmitted employing system information, wherein the system information is employed to convey system information blocks comprising random access parameters to the mobile device.

In some embodiments, although not shown, method 900 can comprise transmitting data to the mobile device, wherein the transmitting comprises transmitting the data employing the selected second beam instead of the selected first beam.

In some embodiments, although not shown, method 900 can comprise transmitting data to the mobile device, wherein the transmitting comprises transmitting the data employing the selected first beam and the selected second beam with a result that a same content of the data is transmitted on the selected first beam and the selected second beam.

Figure 10:
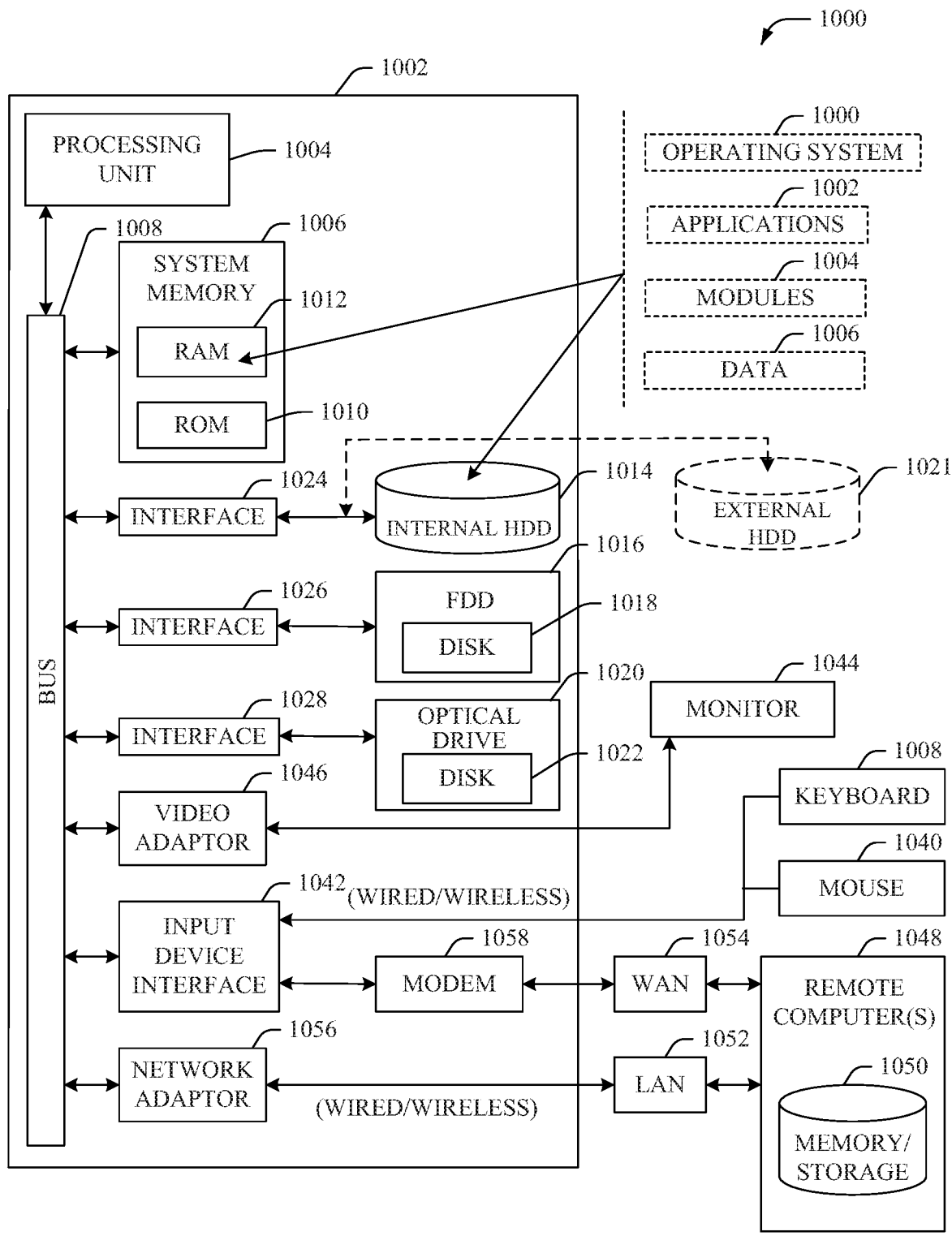
FIG. 10 illustrates a block diagram of a computer that can be employed in accordance with one or more embodiments described herein.

FIG. 10 illustrates a block diagram of a computer that can be employed in accordance with one or more embodiments. Repetitive description of like elements employed in other embodiments described herein is omitted for sake of brevity. In some embodiments, the computer, or a component of the computer, can be or be comprised within any number of components described herein comprising, but not limited to, base station device 102 or mobile device 104 (or a component of base station device 102 or mobile device 104).

In order to provide additional text for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 10, the example environment 1000 for implementing various embodiments of the embodiments described herein comprises a computer 1002, the computer 1002 comprising a processing unit 1004, a system memory 1006 and a system bus 1008. The system bus 1008 couples system components comprising, but not limited to, the system memory 1006 to the processing unit 1004. The processing unit 1004 can be any of various commercially available processors. Dual microprocessors and other multiprocessor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1010 (e.g., EIDE, SATA), which internal hard disk drive 1014 can also be configured for external use in a suitable chassis (not shown), a magnetic floppy disk drive 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface, respectively. The interface 1024 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1002, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A communication device can enter commands and information into the computer 1002 through one or more wired/wireless input devices, e.g., a keyboard 1038 and a pointing device, such as a mouse 1040. Other input devices (not shown) can comprise a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically comprises other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also comprise a wireless AP disposed thereon for communicating with the wireless adapter 1056.

When used in a WAN networking environment, the computer 1002 can comprise a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based protocols for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criterion which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A method, comprising:
receiving, by a base station device comprising a processor from a mobile device, a message indicating first beam information for a selected first beam of beams associated with the base station device and indicating second beam information for a selected second beam of the beams, wherein the selected second beam is an alternative to the selected first beam for transmission of downlink data to the mobile device from the base station device; and
in response to the receiving the first beam information, facilitating, by the base station device, transmitting, to the mobile device, a random access channel response as a second message of a two step random access channel procedure.

2. The method of claim 1, further comprising, prior to the receiving the message indicating the first beam information and the second beam information, facilitating, by the base station device, transmitting, to the mobile device, a signal comprising a command to the mobile device to transmit, to the base station device, information about an alternative beam that is to be the alternative to the selected first beam, and wherein the facilitating the transmitting of the signal comprises employing system information of the base station device.

3. The method of claim 2, wherein the facilitating the transmitting of the signal comprises facilitating the transmitting of a dedicated signal, to the mobile device, in lieu of a broadcast signal, and wherein the dedicated signal comprises the system information from the base station device.

4. The method of claim 2, wherein the system information is included in a system information block comprising random access parameter information and transmitted using a downlink shared channel.

5. The method of claim 2, wherein the system information indicates a format of the first message of the two step random access channel procedure and whether the mobile device is to report an identification of the alternative beam to the base station device.

6. The method of claim 1, further comprising:
employing, by the base station device, the selected second beam instead of the selected first beam; and
facilitating, by the base station device, transmitting, to the mobile device, the second message of the two step random access channel procedure and user data.

7. The method of claim 1, further comprising:
facilitating, by the base station device, transmitting, to the mobile device, the second message of the two step random access channel procedure and user data, wherein the facilitating the transmitting of the second message and the user data comprises facilitating the transmitting of a same content of the user data via the selected first beam and the selected second beam.

8. The method of claim 1, further comprising:
combining, by the base station device, the selected first beam and the selected second beam into a third beam, wherein the third beam is wider than the selected first beam and the selected second beam; and
facilitating, by the base station device, transmitting, to the mobile device, the second message of the two step random access channel procedure and user data, via the third beam.

9. The method of claim 1, wherein the first beam information is indicated by a random access preamble.

10. A base station device, comprising:
a processor; and
a memory that stores executable instructions that, when executed by the processor, facilitate performance of operations, comprising:
receiving, from a mobile device, a first message indicating first beam information for a selected first beam of beams associated with the base station device, wherein the first message is a first message of a random access channel procedure that is received by the base station device, and wherein the random access channel procedure is employed to facilitate a transfer of the mobile device from an idle state to a connected state; and
receiving, from the mobile device, a second message indicating second beam information for a selected second beam of the beams associated with the base station device.

11. The base station device of claim 10, wherein the operations further comprise, prior to the receiving the second message indicating the second beam information, signaling to the mobile device comprising signaling a command to the mobile device to transmit information to the base station device about an alternative beam, wherein the signaling employs system information, and wherein the system information is employed to convey system information blocks comprising random access parameters to the mobile device.

12. The base station device of claim 11, wherein the signaling comprises signaling system information of a system information block or a master information block indicating a format of the second message indicating the selected second beam and further indicating whether the mobile device is to generate a report identifying the alternative beam.

13. The base station device of claim 10, wherein the operations further comprise:
transmitting data to the mobile device, and wherein the transmitting the data comprises transmitting the data employing the selected second beam instead of the selected first beam.

14. The base station device of claim 10, wherein the operations further comprise:
transmitting data to the mobile device, and wherein the transmitting the data comprises transmitting the data employing the selected first beam and the selected second beam with a result that a same content of the data is transmitted on the selected first beam and the selected second beam.

15. The base station device of claim 10, wherein the operations further comprise:
combining the selected first beam and the selected second beam into a third beam; and
transmitting data to the mobile device, wherein the transmitting comprises transmitting the data employing the third beam.

16. A non-transitory machine-readable storage medium, comprising executable instructions that, when executed by a processor of a mobile device, facilitate performance of operations, comprising:
facilitating transmitting a first message indicating first beam information for a selected first beam of beams associated with a base station device, wherein the first message is part of a random access channel procedure;
facilitating transmitting a second message indicating second beam information for a selected second beam of the beams associated with the base station device, wherein the selected second beam is an alternative to the selected first beam for transmission of downlink data to the mobile device from the base station device; and
receiving, from the base station device, data comprising at least one of: receiving the data via the selected second beam instead of the selected first beam, receiving the data resulting in a same content of the data being transmitted via the selected first beam and the selected second beam, or receiving the data on a third beam.

17. The machine-readable storage medium of claim 16, wherein the operations further comprise, prior to the facilitating the transmitting of the first message indicating the first beam information and the second beam information, receiving signaling from the base station device comprising receiving a command to the mobile device to transmit to the base station device information about an alternative beam.

18. The machine-readable storage medium of claim 17, wherein system information is included in a system information block comprising random access parameter information.

19. The machine-readable storage medium of claim 18, wherein the system information is transmitted from the base station device using a shared downlink channel.

20. The machine-readable storage medium of claim 17, wherein system information indicates a format of the first message of the random access channel procedure.

* * * * *